(12) United States Patent
Davenport et al.

(10) Patent No.: US 10,801,415 B2
(45) Date of Patent: *Oct. 13, 2020

(54) HEAT SHIELD LABYRINTH SEAL

(71) Applicant: PRATT & WHITNEY CANADA CORP., Longueuil (CA)

(72) Inventors: Nigel Davenport, Hillsburgh (CA); Yen-Wen Wang, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 292 days.

This patent is subject to a terminal disclaimer.

(21) Appl. No.: 15/360,161

(22) Filed: Nov. 23, 2016

(65) Prior Publication Data

US 2017/0074170 A1 Mar. 16, 2017

Related U.S. Application Data

(63) Continuation of application No. 14/468,776, filed on Aug. 26, 2014, now Pat. No. 9,534,785.

(51) Int. Cl.
| | |
|---|---|
| *F23R 3/00* | (2006.01) |
| *F02C 7/28* | (2006.01) |
| *F02C 7/18* | (2006.01) |
| *F23R 3/06* | (2006.01) |
| *F02C 7/24* | (2006.01) |
| *F23R 3/04* | (2006.01) |

(52) U.S. Cl.
CPC ............... *F02C 7/28* (2013.01); *F02C 7/18* (2013.01); *F02C 7/24* (2013.01); *F23R 3/002* (2013.01); *F23R 3/005* (2013.01); *F23R 3/007* (2013.01); *F23R 3/06* (2013.01); *F05D 2220/32* (2013.01); *F05D 2230/22* (2013.01); *F05D 2230/30* (2013.01); *F05D 2240/35* (2013.01); *F23R 3/04* (2013.01); *F23R 2900/00012* (2013.01); *F23R 2900/03041* (2013.01); *F23R 2900/03042* (2013.01); *F23R 2900/03043* (2013.01)

(58) Field of Classification Search
CPC .. F23R 3/002; F23R 3/007; F23R 3/06; F23R 3/60; F23R 2900/03041–03044; F01D 11/02; F02C 7/28
USPC .................................................... 60/752–760
See application file for complete search history.

(56) References Cited

U.S. PATENT DOCUMENTS

| | | | |
|---|---|---|---|
| 835,836 | A * | 11/1906 | Schulz ................ F16J 15/4472 277/419 |
| 3,824,030 | A | 7/1974 | DeFeo |
| 3,907,457 | A | 9/1975 | Nakamura et al. |
| 4,642,993 | A | 2/1987 | Sweet |
| 4,832,999 | A | 5/1989 | Sweet |

(Continued)

FOREIGN PATENT DOCUMENTS

| | | |
|---|---|---|
| GB | 2353589 | 2/2001 |
| GB | 2361304 | 10/2001 |

*Primary Examiner* — Gerald L Sung
*Assistant Examiner* — Rene D Ford
(74) *Attorney, Agent, or Firm* — Norton Rose Fulbright Canada LLP

(57) ABSTRACT

A seal for sealing a combustor heat shield against an interior surface of a combustor shell, the seal comprising: a first sealing surface on the interior surface of the combustor shell; and a second sealing surface on a rail on an edge of a heat shield, wherein each of the first and second sealing surfaces include first and second projections defining a non-linear leakage path between the projections.

14 Claims, 5 Drawing Sheets

(56) References Cited

U.S. PATENT DOCUMENTS

| | | | |
|---|---|---|---|
| 5,253,471 | A | 10/1993 | Richardson |
| 5,291,732 | A | 3/1994 | Halila |
| 5,363,643 | A | 11/1994 | Halila |
| 5,509,270 | A | 4/1996 | Pearce et al. |
| 5,581,999 | A | 12/1996 | Johnson |
| 5,974,805 | A | 11/1999 | Allen |
| 6,470,685 | B2 | 10/2002 | Pidcock et al. |
| 6,938,424 | B2 | 9/2005 | Tiemann |
| 7,665,306 | B2 | 2/2010 | Bronson et al. |
| 7,849,694 | B2 | 12/2010 | Dahlke et al. |
| 8,113,004 | B2 | 2/2012 | Carlisle et al. |
| 2002/0056277 | A1 | 5/2002 | Parry |
| 2005/0081527 | A1 | 4/2005 | Howell et al. |
| 2006/0255549 | A1 | 11/2006 | Amos et al. |
| 2009/0077974 | A1 | 3/2009 | Dahlke et al. |
| 2012/0240583 | A1* | 9/2012 | Penz ............ F23R 3/002 60/722 |
| 2013/0327057 | A1 | 12/2013 | Cunha et al. |
| 2015/0096302 | A1 | 4/2015 | Herborth |

* cited by examiner

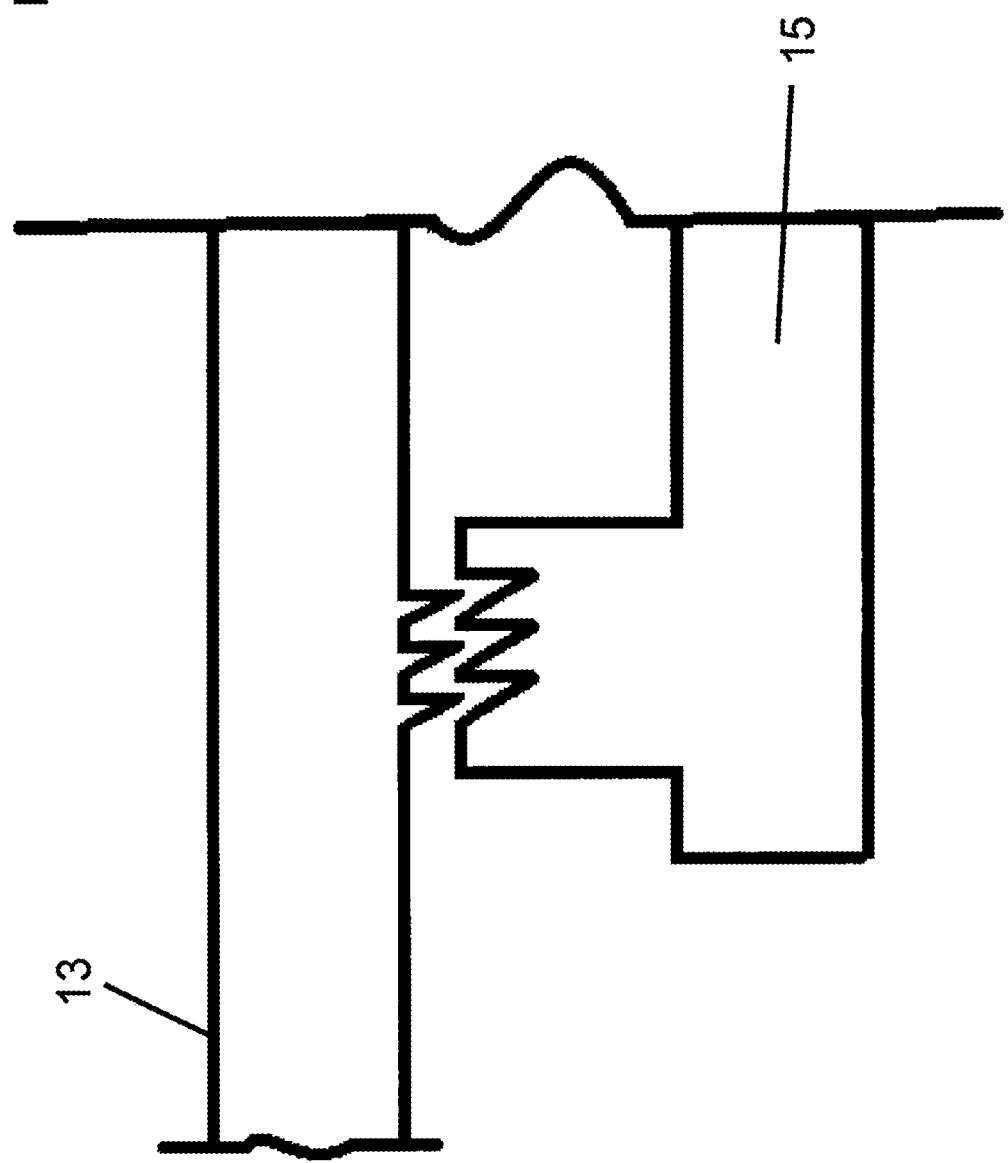

HEAT SHIELD LABYRINTH SEAL

RELATED APPLICATION

This application is a continuation of U.S. patent application Ser. No. 14/468,776 filed on Aug. 26, 2014, the content of which is hereby incorporated by reference.

TECHNICAL FIELD

The application relates to sealing of the edges of combustor heat shields to the combustor shell of a gas turbine engine.

BACKGROUND OF THE ART

The combustors of gas turbine engines have a metal support shell that is protected from the heat of combustion gases by a ceramic lining made of multiple heat shields abutting together at their adjacent edges. The combustor shells and heat shields are perforated to permit compressed cooling air to pass from a surrounding plenum through the combustor shell into an intermediate cooling chamber then through the heat shield into the hot gases within the combustor. The heat shield and flow of cooling air prevent direct contact between the metal combustor shell and the hot combustion gases. The flow of cooling air cools the combustor shell and heat shields.

The compressed cooling air contained within the intermediate cooling chamber has a higher pressure than the combustion gases to propel the cooling air into the combustor in the intended direction of flow. Since the heat shields containing the compressed cooling air are made of multiple panels with edge joints and include openings for igniters and fuel nozzles, adequate sealing of the heat shield edges and openings is necessary to ensure that the flow of cooling air is controlled. Production of compressed cooling air in the air compressor of the engine consumes energy and accordingly excessive or uncontrolled leakage of cooling air represents a loss of energy and lower engine efficiency. For example, in some gas turbine engines, significant amount of cooling air is leaked through gaps between the heat shield and combustor wall. The leaked cooling air can be used more efficiently for cooling purposes if leakage volume is reduced and controlled.

It is desirable to reduce the uncontrolled leakage of cooling air around openings and edges of the heat shield panels within a combustor to reduce the unnecessary consumption of cooling air and thereby increase engine efficiency.

SUMMARY

In accordance with a general aspect, there is provided a seal for sealing a gap between a combustor heat shield and an interior surface of an annular combustor shell extending about an axis, the seal comprising: a first sealing surface extending along a circumferential direction on the interior surface of the combustor shell; and a second sealing surface on a rail extending along the circumferential direction from the combustor heat shield, wherein the first and second sealing surfaces respectively include first and second circumferential projections, which jointly define a continuous non-linear leakage path along a circumferential segment of the combustor shell in a plane normal to the axis of the combustor shell.

In accordance with a second aspect, there is provided a gas turbine engine combustor comprising: a combustor shell extending about an axis, first and second axially adjacent heat shields having respective back faces positioned in spaced-apart facing relationship with an interior surface of the combustor shell to define an air gap between the heat shield and the combustor shell, first and second axially adjacent circumferentially extending sealing surfaces on the interior surface of the combustor shell; and third and fourth sealing surfaces respectively on first and second circumferential rails extending respectively from the back face of the first and second combustor heat shields, the first and third sealing surfaces being axially aligned and overlapping each other in a radial direction, thereby defining a first non-linear leakage path in an axial direction, the second and fourth sealing surfaces being axially aligned and overlapping each other in a radial direction, thereby defining a second non-linear leakage path adjacent to said first non-linear leakage path.

DESCRIPTION OF THE DRAWINGS

FIG. 5 is a detail axial cross-section view similar to FIG. 4 showing a third embodiment where the orientation of the triangular ridges have been reversed compared to FIG. 4 in a serrated labyrinth seal configuration.

DETAILED DESCRIPTION

Figure 1:
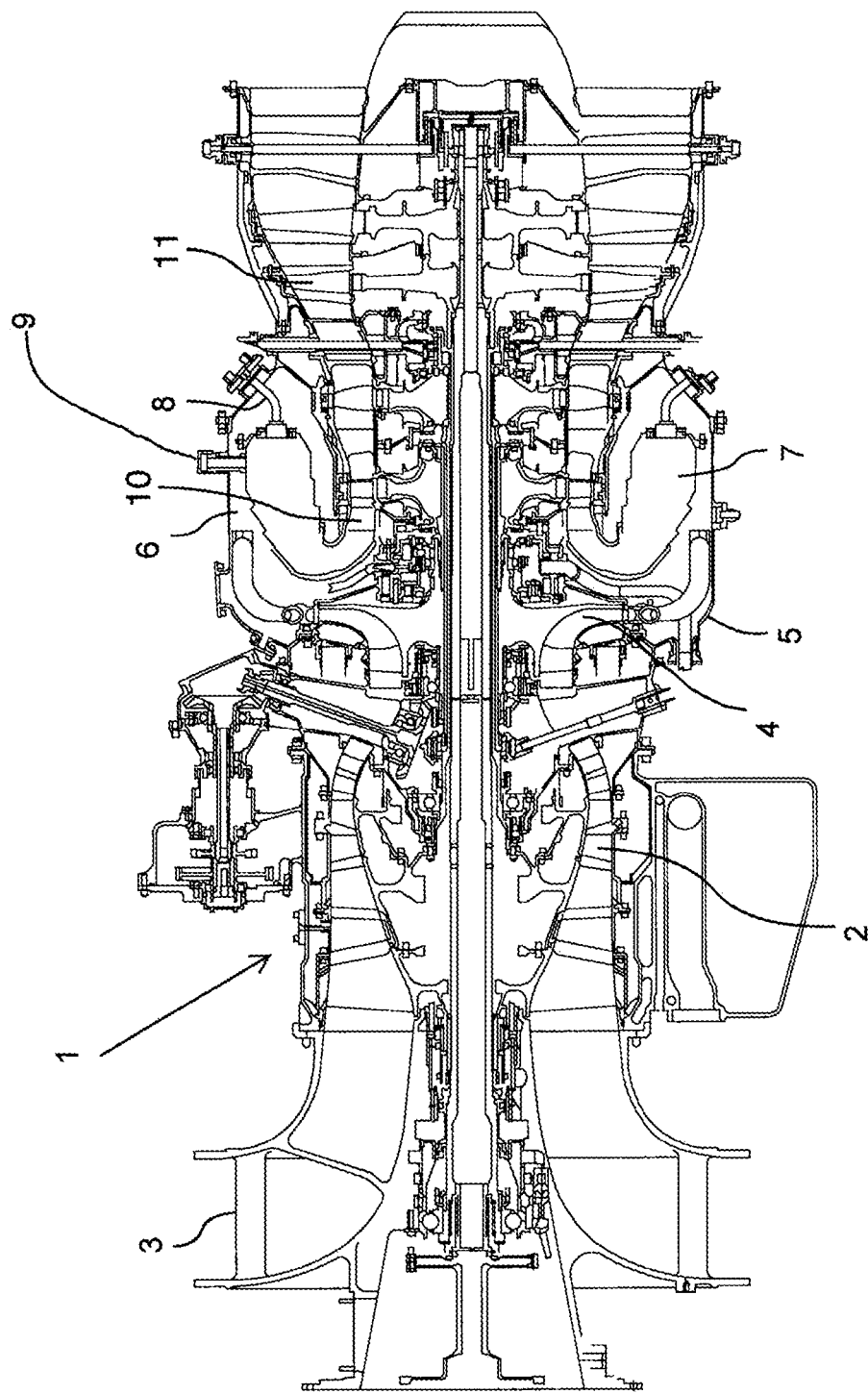
FIG. 1 is an axial cross-sectional view through an example prior art turbo-shaft gas turbine engine having a combustor including interior heat shield liner panels.

FIG. 1 shows an axial cross-section through an example turbo-shaft gas turbine engine 1. It will be understood that the invention is equally applicable to any type of gas turbine engine 1 with a combustor 7 and turbines 11 such as a turbo-fan, a turbo-prop, or auxiliary power units.

In the example, air enters the engine 1 through the intake 3 then into the low-pressure axial compressor 2 and high-pressure centrifugal compressor 4. Compressed air exits the high-pressure compressor 4 through a diffuser 5 and is contained within a plenum 6 that surrounds the combustor 7.

Figure 2:
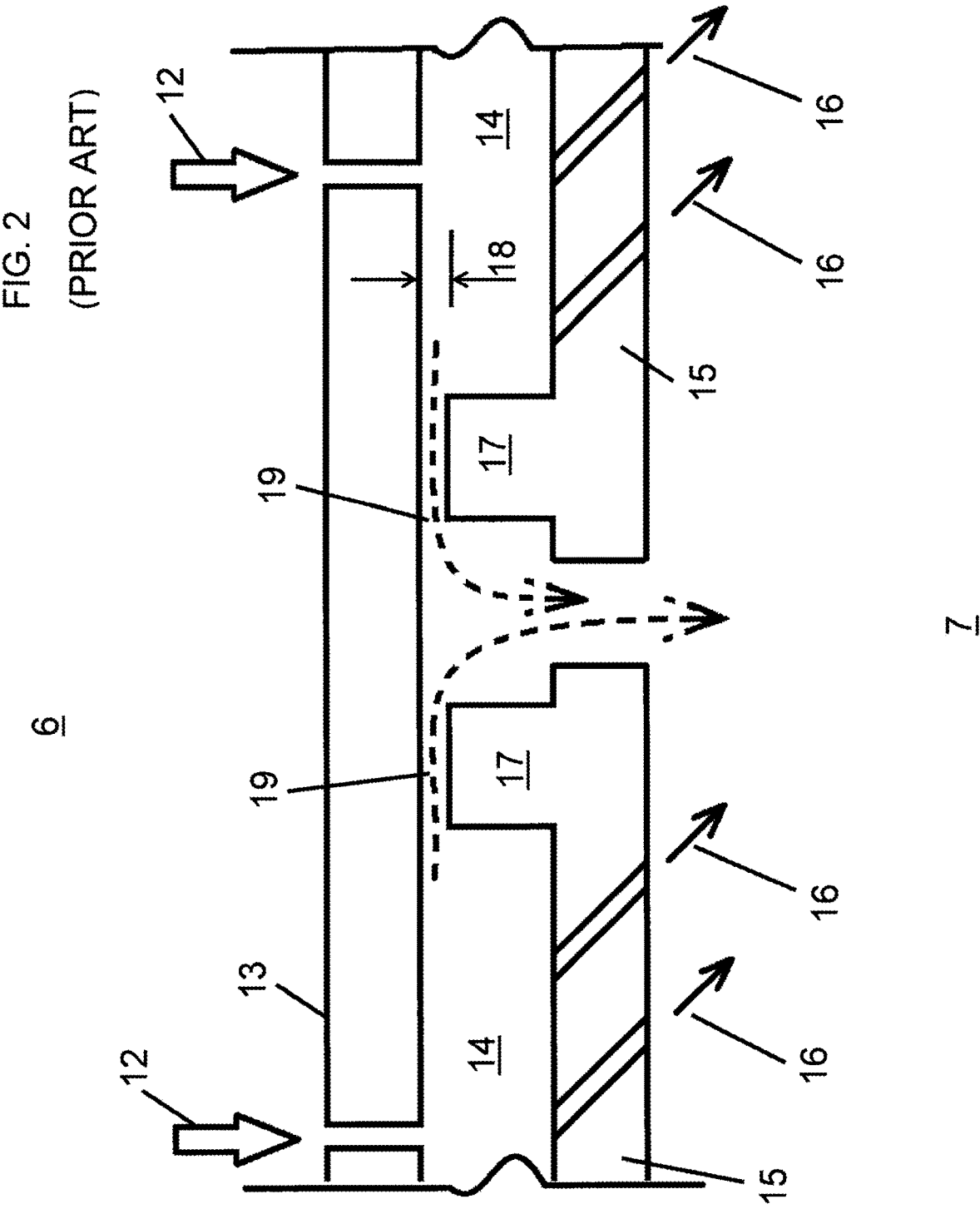
FIG. 2 is a detail axial cross-section view through the prior art combustor shell and heat shield panel of FIG. 1, showing the edge seals of two adjacent heat shield panels with a rail sealed against the interior surface of the combustor shell where solid arrows indicate cooling air inflow and outflow and where dashed arrows indicate leakage past the rail.

The combustor 7 in the example is a reverse flow annular combustor 7 with perforated inner and outer combustor shells 13 (see FIG. 2). Fuel is supplied to the fuel nozzles through fuel tubes 8 and fuel is mixed with compressed air from the plenum 6 when sprayed through nozzles into the combustor 7 as a fuel air mixture that is ignited by the igniter 9. Hot gases from the combustor 7 pass over the nozzle guide vane 10 and drive the turbines 11 before exiting the tail of the engine as exhaust.

As seen in the detail view of FIG. 2, the inflow of compressed air 12 from the plenum 6 passes through perforations in the combustor shell 13 and enters an intermediate chamber 14 between the combustor shell 13 and the heat shields 15. The heat shields 15 have perforations to direct an outflow flow of cooling air 16 to enter the combustor 7. The outflow of cooling air 16 mixes with the fuel-air mixture in the combustor 7 and immediately on exit also forms a cooling air film to cool and protect the heat shields 15 from heat and combustion gases.

The intermediate chamber 14 has a higher internal pressure than the combustor 7 and the heat shields 15 have rails 17 along their external edges to seal the intermediate chamber 14 against the surface of the combustor shield 13. The combustor shell 13 is generally manufactured by machining of a metal alloy with a high heat resistance or more recently by direct metal laser sintering (DMLS) additive manufacturing. The heat shields 15 are generally cast of ceramic or metal alloy and can be produced by the metal injection molding (MIM) process. Due to manufacturing dimensional tolerances and fitting of two parts with mating surfaces, the assembly will always result in a gap 18 through which some compressed air leakage 19 occurs (shown as dashed arrows). Some degree of air leakage 19 is beneficial since outward air flow purges hot combustion gases that would otherwise be trapped in eddies within the edge joint area of the heat shields 15.

However leakage through the gap 18 that is uncontrolled or excessive is detrimental since leakage 19 can decrease engine efficiency through increased use of compressed cooling air and dilution of combustion gases. Leakage 19 is especially undesirable in smaller engines since manufacturing tolerances are similar to those of larger engines, however the proportion of air leakage 19 relative to controlled air outflow 16 is greater in smaller engines. The same size of gap 18 will lead to a generally greater proportion of leaked air 19 relative to controlled air outflow 16 in a smaller engine compared to a larger engine. Hence controlling and reducing leakage 19 is desirable especially in smaller gas turbine engines.

The development of the metal injection molding (MIM) process, the direct metal laser sintering (DMLS) process and other additive manufacturing processes allow manufacture of sealing surfaces with detailed shapes and configurations which can be used to reduce cooling air leakage 19 from the intermediate chamber 14.

Figure 3:
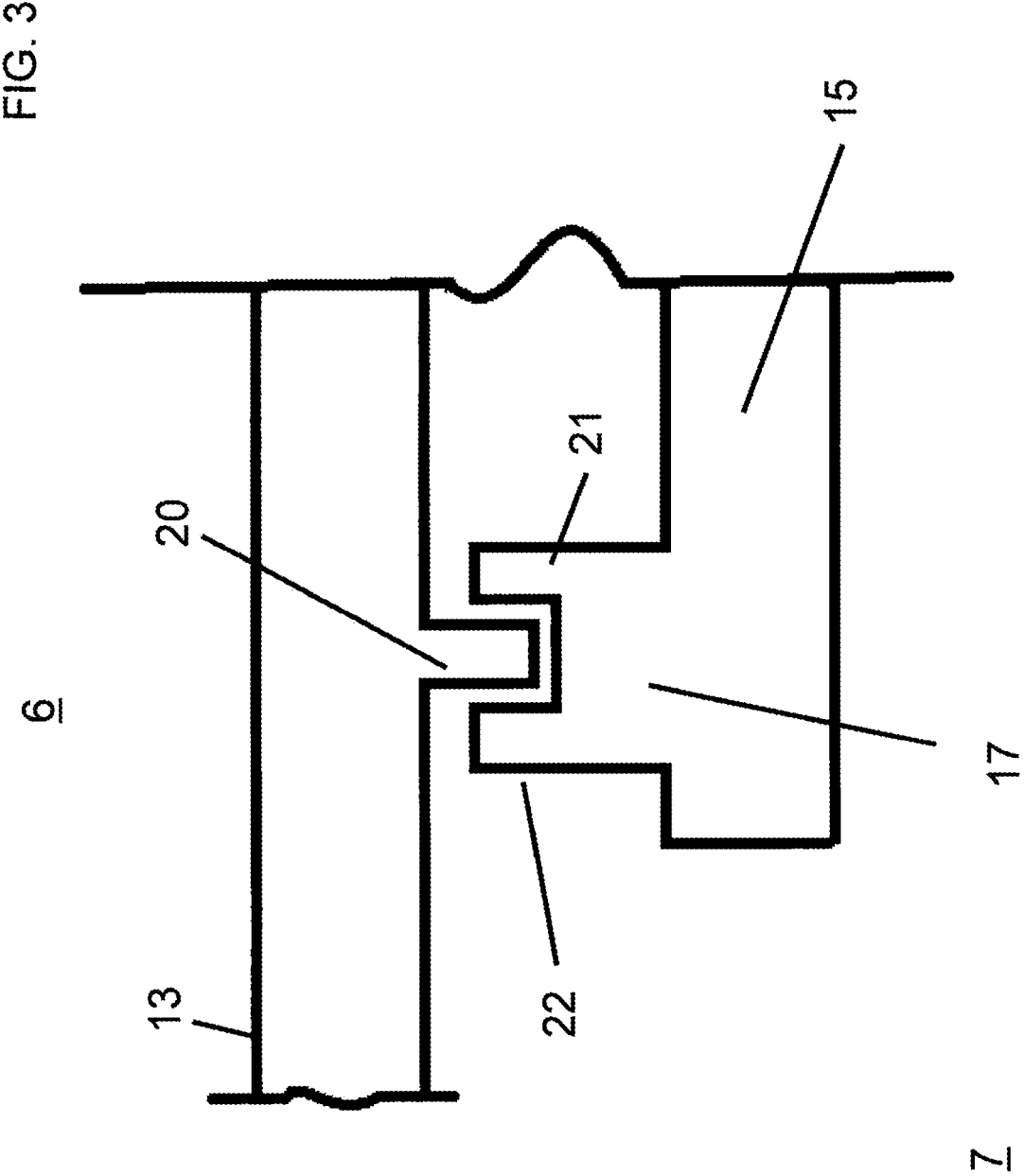
FIG. 3 is a detail axial cross-section view of a first embodiment of the invention (similar to FIG. 2) showing a rail with two ridges on the heat shield panel and a ridge extending from the combustor shell together creating a castellated labyrinth seal configuration.

FIG. 3 shows a detail of the first embodiment with a seal for sealing the combustor heat shield 15 against the interior surface of the combustor shell 13 to contain compressed cooling air within the intermediate chamber 14 and impede leakage. The seal includes a first sealing surface on the interior surface of the combustor shell having a single rectangular ridge projection 20 and a second sealing surface on the rail 17 on the edge of the heat shield 15 made of an upstream rectangular ridge projection 21 and a downstream rectangular ridge projection 22. The ridges 20, 21, and 22 of FIG. 3 are a castellated series of mating rectangular ridges defining a non-linear leakage path between them.

Figure 4:
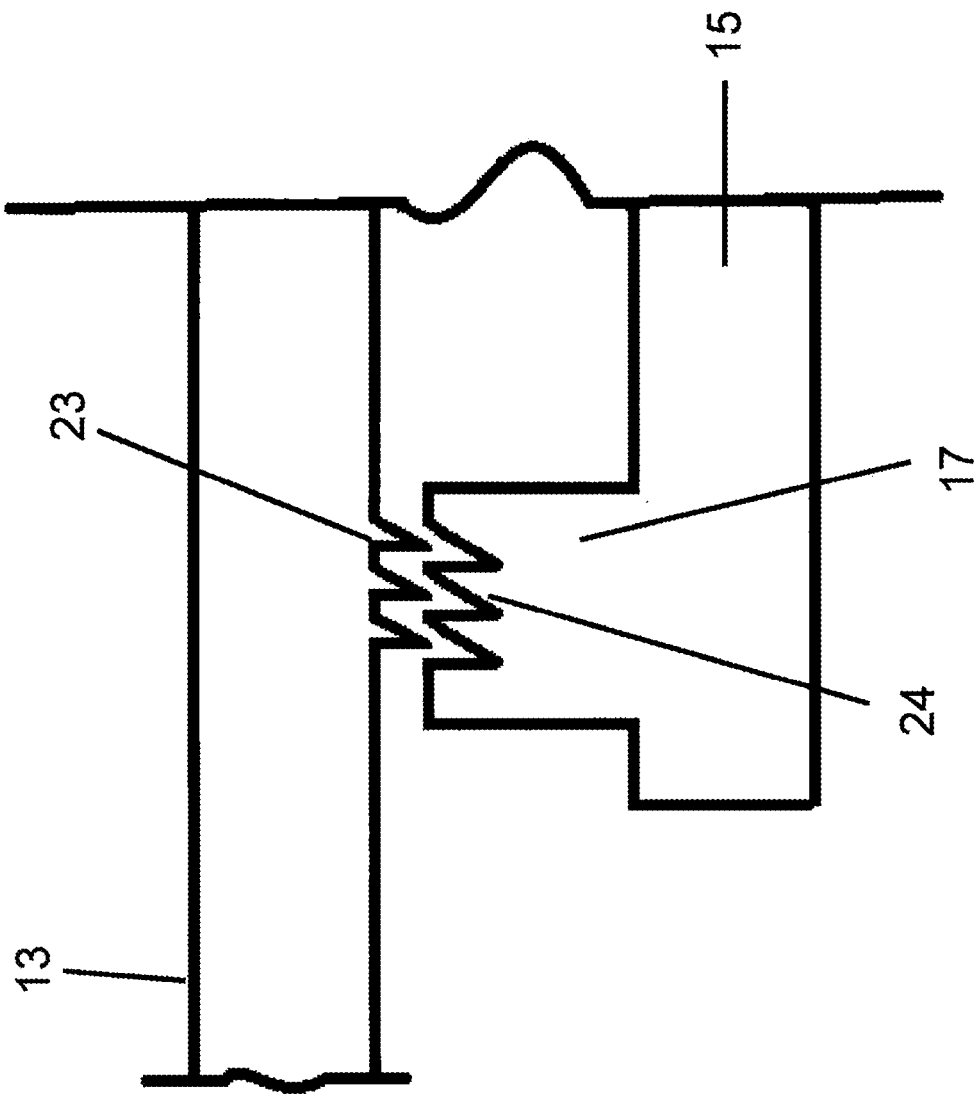
FIG. 4 is a detail axial cross-section view showing a second embodiment showing a rail on the heat shield panel with a series of triangular ridges and triangular ridges extending from the combustor shell together creating a serrated labyrinth seal configuration.

FIG. 4 shows a second embodiment of the invention where the ridges 23, 24 are a serrated series of mating triangular ridges. FIG. 5 shows a third embodiment of the invention where the ridges are reversed in orientation compared to FIG. 4.

In all cases the non-linear leakage path impedes the cooling air leakage by increasing resistance to air flow. For example modelling of the castellated path shown in FIG. 3 reveals that leakage can be reduced by up to 50% or more compared to the prior art path shown in FIG. 2.

The first projections 20, 23 on the combustor shell are manufactured using a direct metal laser sintering (DMLS) process which deposits fine powdered metal particles on the surface and melts the particles in an additive manufacturing method. Very accurate and fine detail is possible using this method.

The second projections 21, 22, 24 on the rail 17 are manufactured using a metal injection molding (MIM) process which injects fine powdered metal particles in a plastic matrix into a mold. The molded part is treated to remove the plastic matrix and to bond the metal particles together. The MIM process also produces very accurate and fine detail that is not practical using machining or ceramic molding techniques common to the prior art.

The above description is meant to be exemplary only, and one skilled in the art will recognize that changes may be made to the embodiments described without departing from the scope of the invention disclosed.

We claim:

1. A seal for sealing a gap between a combustor heat shield and an interior surface of an annular combustor shell extending about an axis, the seal comprising:
   a first sealing surface extending along a circumferential direction on the interior surface of the combustor shell; and
   a second sealing surface at a distal end surface of a rail extending from the combustor heat shield towards the combustor shell, the rail extending along the circumferential direction, wherein the first sealing surface includes a first circumferential projection, wherein the second sealing surface comprises a labyrinth seal integrated in the distal end surface of the rail, the labyrinth seal comprising a second projection including a first ridge and a second ridge, the first and second ridges defining a recess therebetween in the distal end surface of the rail, the first and second sealing surfaces jointly defining a continuous non-linear leakage path of a circumferential segment of the combustor shell, the leakage path formed along the axis, and wherein the first circumferential projection extends radially inwardly from the interior surface of the combustor shell into the recess in the distal end surface of the rail, wherein the first circumferential projection includes a metal alloy, and wherein the second projection includes a ceramic alloy.

2. The seal according to claim 1 wherein the first and second projections are mating projections.

3. The seal according to claim 1 wherein at least one of the first and second projections comprises a continuous circumferential ridge having a cross-sectional profile.

4. The seal according to claim 3 wherein the cross-sectional profile is selected from the group consisting of: a rectangular profile; and a triangular profile.

5. The seal according to claim 4 wherein the first and second projections comprise a castellated series of mating rectangular ridges.

6. The seal according to claim 4 wherein the first and second projections comprise a serrated series of mating triangular ridges.

7. The seal according to claim 1 wherein the first projections are manufactured using a direct metal laser sintering (DMLS) process.

8. The seal according to claim 1 wherein the second projections are manufactured using a metal injection molding (MIM) process.

9. A gas turbine engine combustor comprising: a combustor shell extending about an axis, first and second axially adjacent heat shields having respective back faces positioned in spaced-apart facing relationship with an interior surface of the combustor shell to define an air gap between the heat shield and the combustor shell, first and second axially adjacent circumferentially extending sealing surfaces on the interior surface of the combustor shell; and third and fourth sealing surfaces respectively on first and second circumferential rails extending respectively from the back face of the first and second combustor heat shields, the first and third sealing surfaces being axially aligned and overlapping each other in a radial direction, thereby defining a first non-linear leakage path in an axial direction, the second and fourth sealing surfaces being axially aligned and overlapping each other in a radial direction, thereby defining a second non-linear leakage path adjacent to said first non-linear leakage path, wherein the first and second axially adjacent circumferentially extending sealing surfaces comprise respective projections extending radially inwardly from the interior surface of the combustor shell, wherein the third and fourth sealing surfaces include respective labyrinth seals integrated in a distal end surface of the first and second circumferential rails, and wherein the projections extending from the interior surface of the combustor shell include a metal alloy whereas the labyrinth seals at the distal end surface of the first and second circumferential rails include a ceramic alloy.

10. The combustor according to claim 9 wherein the first and third sealing surfaces include a first set of mating projections, and wherein the second and fourth sealing surfaces include a second set of mating projections.

11. The combustor according to claim 10 wherein at least one of the first and second sets of projections comprises a circumferentially continuous ridge having a cross-sectional profile.

12. The combustor according to claim 11 wherein the cross-sectional profile is selected from the group consisting of: a rectangular profile; and a triangular profile.

13. The combustor according to claim 12 wherein each of the first and second sets of projections comprise a castellated series of mating rectangular ridges.

14. The combustor according to claim 12 wherein at least one of the first and second sets of projections comprise a serrated series of mating triangular ridges.

* * * * *